United States Patent
Huang et al.

(10) Patent No.: US 9,325,036 B2
(45) Date of Patent: Apr. 26, 2016

(54) MOLTEN SALT-CONTAINING METAL ELECTRODE FOR RECHARGEABLE OXIDE-ION BATTERY CELLS OPERATING BELOW 800°C

(75) Inventors: Kevin Huang, Export, PA (US); Chun Lu, Sewickley, PA (US); James L. Shull, Murrysville, PA (US); Shih-Yu W. Liu, Pittsburgh, PA (US); Shailesh D. Vora, Monroeville, PA (US)

(73) Assignee: Siemens Aktiengesellschaft, München (DE)

( * ) Notice: Subject to any disclaimer, the term of this patent is extended or adjusted under 35 U.S.C. 154(b) by 1325 days.

(21) Appl. No.: 12/850,086

(22) Filed: Aug. 4, 2010

(65) Prior Publication Data
US 2011/0256448 A1     Oct. 20, 2011

Related U.S. Application Data

(60) Provisional application No. 61/325,568, filed on Apr. 19, 2010.

(51) Int. Cl.
H01M 10/39     (2006.01)
H01M 4/58      (2010.01)

(52) U.S. Cl.
CPC .......... H01M 10/399 (2013.01); H01M 4/582 (2013.01)

(58) Field of Classification Search
None
See application file for complete search history.

(56) References Cited

U.S. PATENT DOCUMENTS

| | | | |
|---|---|---|---|
| 3,977,901 A | 8/1976 | Buzzelli | |
| 4,054,729 A | 10/1977 | Isenberg | |
| 4,078,125 A | 3/1978 | Brown | |
| 4,474,862 A * | 10/1984 | Buzzelli et al. | 429/403 |
| 6,399,247 B1 | 6/2002 | Kitayama et al. | |
| 7,396,612 B2 | 7/2008 | Ohata et al. | |

* cited by examiner

*Primary Examiner* — Ula C Ruddock
*Assistant Examiner* — Frank Chernow

(57) ABSTRACT

A rechargeable oxide-ion battery cell 20, operating below 800° C., containing a molten salt-containing electrode 22, made of active metal-active metal oxide-active metal salt; which electrode is associated with an electrolyte 24 and an air electrode 26 to provide the cell 20.

20 Claims, 3 Drawing Sheets

Reaction Path 1: $Me + xO^{2-} \Longleftrightarrow MeO_x + 2xe^-$

Reaction Path 2: $xO^{2-} \Longleftrightarrow x/2 O_{2(g)} + 2xe^-$
$x/2 O_{2(g)} + Me \Longleftrightarrow MeO_x$ $x/2 O_{2(g)} + 2xe^- \Longleftrightarrow xO^{2-}$

MOLTEN SALT-CONTAINING METAL ELECTRODE FOR RECHARGEABLE OXIDE-ION BATTERY CELLS OPERATING BELOW 800°C

CROSS REFERENCE TO RELATED APPLICATION

This application claims priority under 35 U.S.C. §119(e) to U.S. Provisional. Patent Application Ser. No. 61/325,568, filed Apr. 19, 2010, entitled, MOLTEN SALTS METAL ELECTRODES FOR SIEMENS RECHARGEABLE OXIDE-ION BATTERIES.

BACKGROUND OF THE INVENTION

1. Field of the Invention

This present invention relates to molten metal electrodes in an operating, rechargeable oxide-ion battery (ROB) cell.

2. Description of Related Art

Electrical energy storage is crucial for the effective proliferation of an electrical economy and for the implementation of many renewable energy technologies. During the past two decades, the demand for the storage of electrical energy has increased significantly in the areas of portable, transportation, load-leveling and central backup applications. The present electrochemical energy storage systems are too costly to penetrate major new markets. Higher performance is required, and environmentally acceptable materials are preferred. Transformational changes in electrical energy storage science and technology are in great demand to allow higher and faster energy storage at lower costs, and longer lifetimes are necessary for major market enlargement. Most of these changes require new materials and/or innovative concepts, with demonstration of larger redox (reduction-oxidation) and reversible and facile kinetics.

Batteries are by far the most common form of storing electrical energy ranging from: standard every day lead-acid batteries; exotic iron-silver batteries taught by Brown in U.S. Pat. No. 4,078,125; nickel-metal hydride (NiMH) batteries taught by Kitayama in U.S. Pat. No. 6,399,247 B1; metal-air batteries taught in U.S. Pat. No. 3,977,901 (Buzzelli) and Isenberg in U.S. Pat. No. 4,054,729; and to the lithium-ion battery taught by Ohata in U.S. Pat. No. 7,396,612 B2.

Batteries range in size from button cells used in watches, to megawatt load leveling applications. They are, in general, efficient storage devices, with output energy typically exceeding 90% of input energy, except at the highest power densities. Rechargeable batteries have evolved over the years from lead-acid through nickel-cadmium and nickel-metal hydride (NiMH) to lithium-ion batteries. NiMH batteries were the initial workhorse for electronic devices such as computers and cell phones, but they have almost been completely displaced from that market by lithium-ion batteries because of the latter's higher energy storage capacity. Today, NiMH technology is the principal battery used in hybrid electric vehicles, but it is likely to be displaced by the higher power energy and now lower cost lithium batteries, if the latter's safety and lifetime can be improved. Of the advanced batteries, lithium-ion is the dominant power source for most rechargeable electronic devices.

What is needed is a dramatically new electrical energy storage device that can easily discharge and charge a high capacity of energy quickly and reversibly, as needed. What is also needed is a device that can operate safely. What is also needed is a device that can operate for years without major maintenance. What is also needed is a device that does not need to operate on natural gas, hydrocarbon fuel or its reformed by-products such as $H_2$. One possibility is a rechargeable oxide-ion battery (ROB), as set out application Ser. No. 12/695,386, filed on Jan. 28, 2010.

A ROB comprises a metal electrode, an oxide-ion conductive electrolyte, and a cathode. The metal electrode undergoes reduction-oxidation cycles during charge and discharge processes for energy storage. For example, in discharging mode, the metal is oxidized:

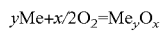

and is reduced in charging mode:

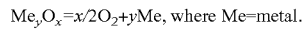

The working principles of a rechargeable oxide-ion battery (ROB) cell 10 are schematically shown in FIG. 1. In discharge mode, oxide-ion anions migrate from high partial pressure of oxygen side air electrode—12 to low partial pressure of oxygen side metal electrode—14 under the driving force of gradient of oxygen chemical potential. There exist two possible reaction mechanisms to oxidize the metal, as shown in FIG. 1. One of them, as designated as Path 1, in that oxide ion can directly electrochemically oxidize metal to form metal oxide. The other, as designated as Path 2, involves generation and consumption of gaseous phase oxygen. The oxide ion can be initially converted to gaseous oxygen molecule on the metal electrode 14, and then further reacted with metal via a solid-gas phase mechanism to form metal oxide. In charge mode, the oxygen species, released by reducing metal oxide to metal via electrochemical Path 1 or solid-gas mechanism Path 2, are transported from the metal electrode back to the air electrode. The electrolyte is shown as 16.

The metal redox reactions are accompanied by large volume variation, for instance, if manganese (Mn) metal is used as the metal electrode, the volume change associated with reaction of $Mn+\frac{1}{2}O_2=MnO$ is 1.73. In the case of tungsten (W), the volume change is 3.39 when W is totally oxidized to $WO_3$. Without an appropriately designed electrode, such drastic volume variation in practice can lead to spallation of metal electrode and possible failure of a ROB cell.

In theory, for energy storage application, oxide ion must be transported across the electrolyte between metal electrode and cathode to carry electrical charge. Therefore, the metal electrode must be properly sealed hermetically to prevent direct contact with an oxygen-containing environment (for example, air). Otherwise, oxygen molecules in air will directly consume the metal without involving charge transfer between electrodes, which will lead to self discharge. High-temperature sealing materials such as glasses and ceramic-glass composites in principle are good candidates for this purpose. However, reliability of high-temperature sealing materials remains questionable upon thermal cycle and long-term operation. Therefore, there is need to design ROB cells whose metal electrode is sealed solely by the cell electrolyte and interconnection without using additional materials for sealing purpose.

Additionally, one of the major challenges facing rechargeable oxide-ion batteries (ROB) are the solid-state oxygen diffusion through the oxide layer and volumetric changes associated with oxidation and reduction during the charging and discharging cycles. In general, in one aspect of application Ser. No. 12/695,386, filed on Jan. 28, 2010, this challenge was addressed by incorporating solid, fine, active metal electrode powders into a mixed oxide-ion and electron conducting porous structural skeleton. It was conceivable that the changes in volume induced during operation could be accommodated by the free volume present in the pores. In such a battery structure, the corresponding electrochemical reactions are perceived to occur via gas-phase as well as solid-phase oxygen diffusion. Despite these engineering design efforts, the fairly slow kinetics of solid-state oxygen diffusion, particularly at lower temperatures is a possible issue for making ROB a practical energy storage device. Therefore, an effective solution to this challenge is deemed a critical path to ROB technology and product development. It is an object of this invention to provide a faster kinetics and a new active metal electrode design for ROB.

SUMMARY OF THE INVENTION

The above object and the above need for producing a metal electrode for ROB cells having a high kinetic metal electrode is provided by providing a molten salt-containing metal electrode for ROB operating between 500° C. and 800° C. This electrode consists essentially of $\alpha$Me-$\beta$MeO$_x$-$\epsilon$MeY, wherein Me is active metal, MeO$_x$ is an active metal oxide, and MeY is an active metal salt compound whose melting point is below 800° C. The terms $\alpha$, $\beta$, $\epsilon$ are the volume fraction of Me, MeO$_x$ and MeY, respectively, wherein $\alpha+\beta+\epsilon=1$. The active metal components (Me and MeO$_x$), at least partially if not totally, dissolve in molten salt originating from MeY during operation. The preferred electrode is Fe—FeO—Fe(Y=halide). The preferred range of $\alpha$ is 5 to 95 vol. %, $\beta$ is 5 to 95 vol. % and $\epsilon$ is 5 to 95 vol. %.

BRIEF DESCRIPTION OF THE DRAWINGS

For a better understanding of the invention, reference may be made to the preferred embodiments exemplary of this invention, shown in the accompanying drawings in which.

DESCRIPTION OF THE PREFERRED EMBODIMENTS

Figure 1:
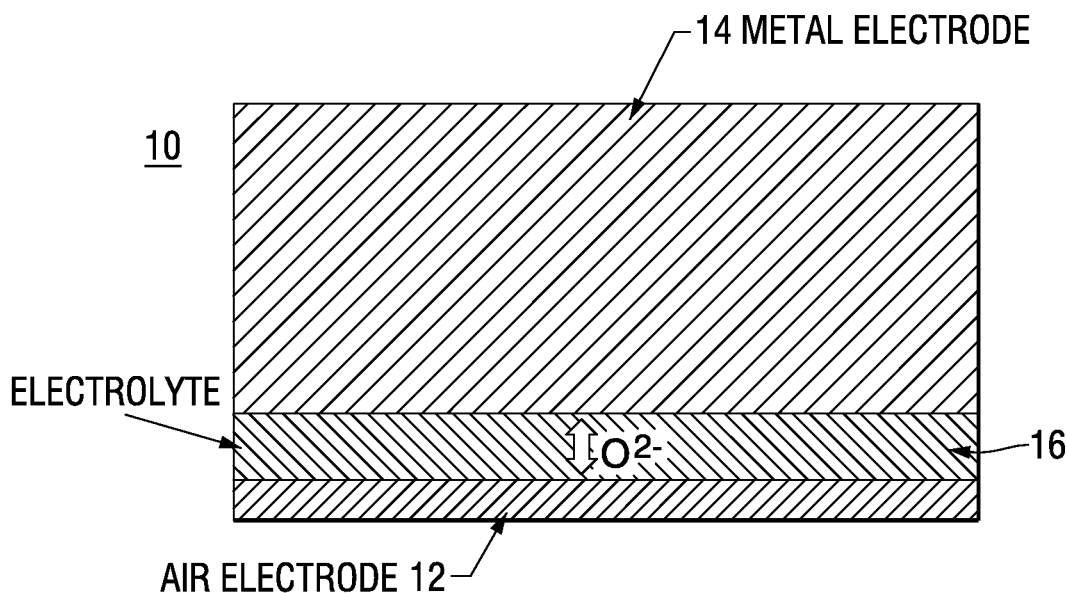
FIG. 1 illustrates the working principals of a solid metal electrode rechargeable oxide-ion battery (ROB) cell.
Figure 2:
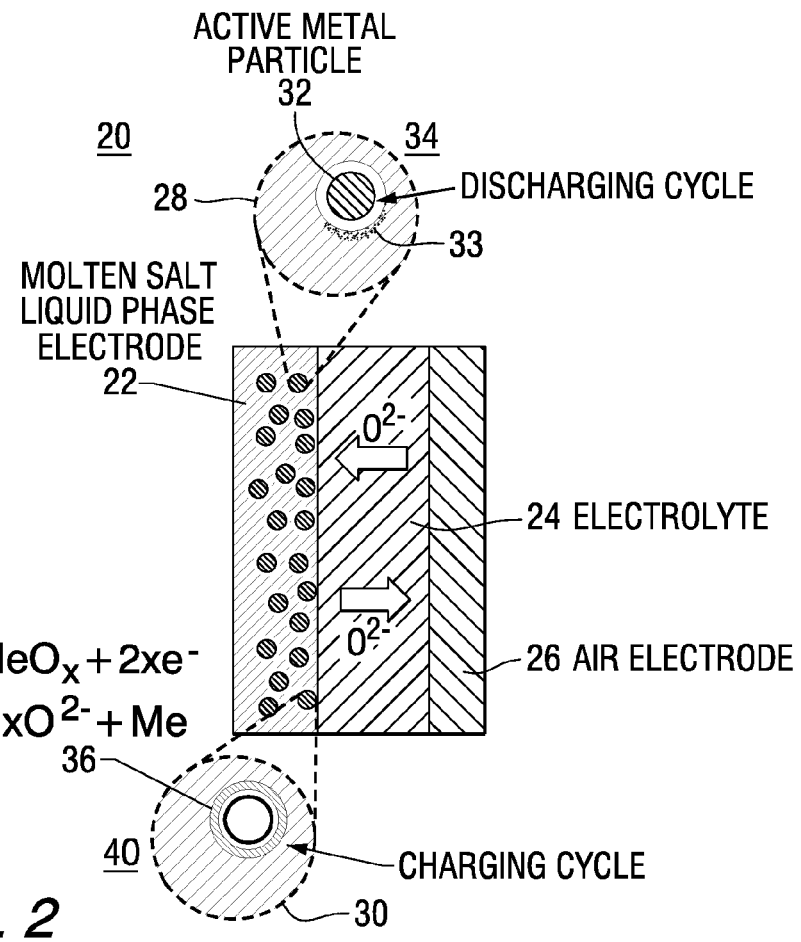
FIG. 2, which best illustrates one aspect of this invention, is a schematic illustration of a liquid phase molten salt metal electrode contacting electrolyte in a ROB cell, operating at from 500° C. to 800° C.

In this invention, a new type of metal electrode comprising molten salts and active metals/metal oxides is presented to address the fundamentally slow kinetics associated with oxygen diffusion. The core of the invention is to use a liquid phase to accelerate the oxygen diffusion and to dissolve the formed chemicals during the charging and discharging cycles. To be more specific, the active metal particles are suspended in a liquid phase at operating temperature. FIG. 2 shows a schematic of the molten salt liquid phase metal electrode 22 contacting an electrolyte 24 which contacts outer air electrode 26 to form a ROB cell 20. In the discharging cycle, the formed oxide can be quickly dissolved into the liquid phase, allowing more active metal surfaces to be oxidized. The oxygen diffusion is assisted by the presence of a liquid phase. A reversed process can be viewed for the charging cycle where the formed oxide can be reduced to metal via a liquid phase. Since the oxygen diffusion through a liquid phase is much faster than that via a solid phase (diffusivity is typically few orders of magnitude higher), the rates of charging/discharging as well as the power density will be markedly improved. To make the liquid phase metal electrode function as designed, several criteria have to be met: 1) the liquid phase is able to conduct electrons, preferably mixed O$^{2-}$ and electrons; 2) the liquid phase is chemically compatible with electrolyte and active metals; and 3) the liquid phase is thermally compatible with electrolyte.

The molten salt liquid phase metal electrode 22 consists essentially of $\alpha$Me-$\beta$MeO$_x$-$\epsilon$Y, wherein Me is active metal, MeO$_x$ is active metal oxide, and MeY is an active metal compound whose melting point is below 800° C., preferably below 700° C. The terms $\alpha$, $\beta$, $\epsilon$ are the volume fraction of Me, MeO$_x$ and MeY, respectively, wherein $\alpha+\beta+\epsilon=1$. The active metal components (Me and MeO$_x$), are soluble in the selected molten salt and at least partially if not totally, dissolve in molten salt originating from Y during operation. The value $X=1-4$.

Here, Me is an active metal selected from the group consisting of Fe, Mn, Ti, Cr, Co, Ni, Cu, Mo, W, Sc, Y, La, Zr, Hf, Ce, Nb, Ta, V, Mo and Pd; with Fe, Mn, Ti, Cr, Co, Ni, Cu, Mo and W preferred and with Fe and Mn most preferred. The Me and MeO$_x$ have solubility in MeY during cell operation. MeY is a metal salt with low melting point, below 800° C., where Y is selected from the group consisting of Br$^-$, F$^-$, I$^-$, Cl$^-$, (OCH$_2$CH$_3$)$^-$, (OCH(CH$_3$)$_2$)$^-$, (OCH$_3$)$^-$, (ClO$_4$)$^-$, NO$_3^-$, CO$_3^{2-}$, SO$_4^{2-}$ and their mixtures, with halide (Br, F, I, Cl) and CO$_3^{2-}$ (carbonate) preferred, and Cl$^-$ most preferred. The most preferred $\alpha$Me-$\beta$MeO$_x$-$\epsilon$MeY is Fe—Fe$_2$O$_3$—FeCl$_2$.

The solubility of Me and MeO$_x$ is shown in the inserts 28 and 30 of FIG. 2, where the active metal particles 32 react as follows:

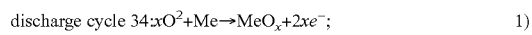

discharge cycle 34:$xO^{2-}$+Me→MeO$_x$+$2xe^-$;  1)

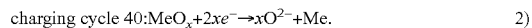

charging cycle 40:MeO$_x$+$2xe^-$→$xO^{2-}$+Me.  2)

In FIG. 2, dissolving oxide is shown as 33 in the discharging cycle 34 and re-deposition of active metal as 36 in the charging cycle 40. Electrolyte 24 contacts the molten salt-containing metal electrode 22 and an opposing air electrode 26 completes the oxide-ion battery cell.

Example

Figure 3:
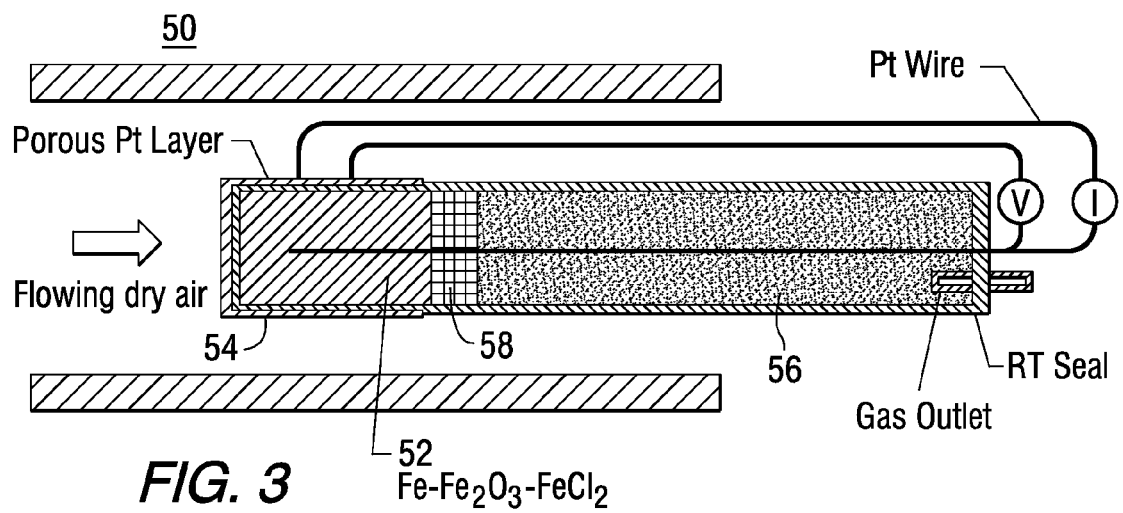
FIG. 3 illustrates a schematic of an experimental set-up for evaluating the liquid metal phase electrode of this invention.

Using a furnace 50 shown in FIG. 3, with the Fe—Fe$_2$O$_3$—FeCl$_2$ electrode 52 of this invention, inserted in a 1.5 mm thick YSZ (yttria stabilized zirconia) tube 54, opposite Al$_2$O$_3$ powder 56 with a saffil separator 58; experiments were run.

Figure 4:
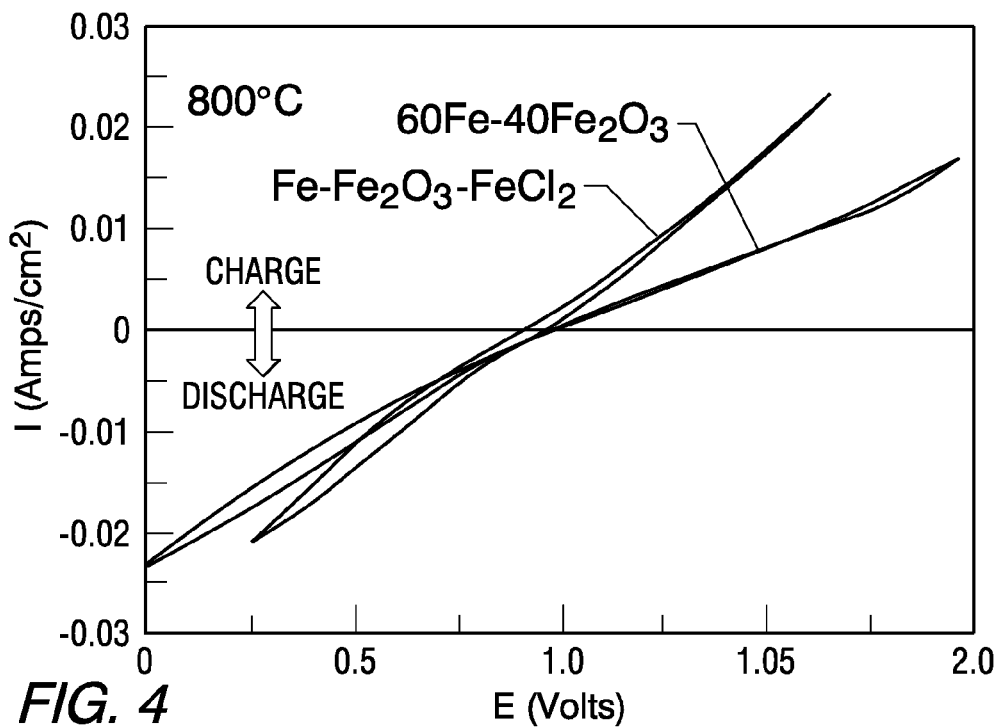
FIG. 4 is a graph of amps/cm$^2$ vs. volts using Fe—Fe$_2$O$_3$ vs. Fe—Fe$_2$O$_3$—FeCl$_3$ molten metal electrode in a ROB.
Figure 5:
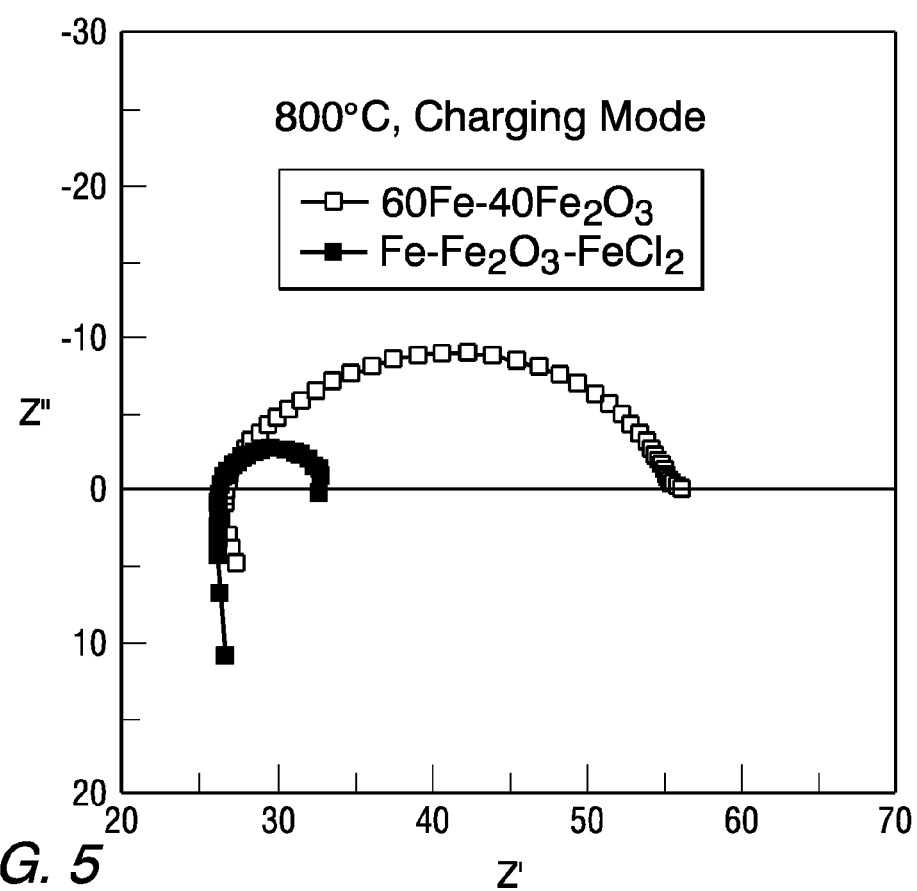
FIG. 5 is an AC impedance spectra measured in a charging mode of Fe—F$_2$O$_3$ solid metal electrode vs. Fe—Fe$_2$O$_3$—FeCl$_3$ molten metal electrode in a ROB.

The first molten salt material tried for the Fe—FeO baseline metal electrode was FeCl$_2$, which has a low melting point of about 680° C. The experiment was conducted using a one-end closed YSZ tube as the electrolyte and Pt mesh as the counter electrode and Pt wire as the current collector. The working electrode consisting of Fe—FeO—FeCl$_2$ in weight ratio of 11:16:73 was packed inside the YSZ tube, along with Pt wire as the current collector. The performance of thus assembled battery was then subject to AC impedance analysis and DC charging and discharging characterizations. FIGS. 4 and 5 compare cyclic voltammograms (FIG. 4) and AC impedance spectra in charging mode (FIG. 5) for the liquid and regular solid-state metal electrodes. They show a remarkable improved discharge/charge performance along with reduction in electrode resistance for the liquid electrode of this invention. This very strongly suggests improved electrode kinetics by the presence of liquid phase in the metal electrode.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A molten salt-containing electrode for a rechargeable oxide-ion battery cell operating below 800° C., comprising:
   a molten salt-containing electrode consisting essentially of α Active Metal-β Active Metal Oxide-ε Active Metal Y, where Active Metal Y is a salt, α+β+ε=1 with α, β and ε each being between 0 and 1, and the Active Metal and Active Metal Oxide are soluble in the selected salt, when molten at from 500° C. to 800° C.

2. The molten salt-containing electrode of claim 1, wherein the active metal is selected from the group consisting essentially of Fe, Ti, Cr, Co, Ni, Cu, Mo, W, Sc, Y, La, Zr, Hf, Ce, Nb, Ta, V, Mo and Pd.

3. The molten salt-containing electrode of claim 1, wherein the active metal is selected from the group consisting essentially of Fe and Mn.

4. The molten salt-containing electrode of claim 1, wherein the active metal is Fe.

5. The molten salt-containing electrode of claim 1, wherein Y is selected from the group consisting essentially of $Br^-$, $F^-$, $I^-$, $Cl^-$, $(OCH_2CH_3)^-$, $(OCH(CH_3)_2)^-$, $(OCH_3)^-$, $(ClO^4)^-$, $NO_3^-$, $CO_3^{2-}$, $SO_4^{2-}$ and their mixtures.

6. The molten salt-containing electrode of claim 1, wherein Y is halide.

7. The molten salt-containing electrode of claim 1, wherein Y is carbonate.

8. The molten salt-containing electrode of claim 1, wherein Y is $Cl^-$.

9. The molten salt-containing electrode of claim 1, wherein the oxide-ion battery cell operates between 500° C. and 800° C.

10. The molten salt-containing electrode of claim 1, wherein the oxide-ion battery cell operates between 500° C. and 700° C.

11. The molten salt-containing electrode of claim 1, wherein the molten salt containing electrode is αFe—βFeO—εFe halide, wherein α+β+ε are volume fractions that sum to 1.

12. The molten salt-containing electrode of claim 1, wherein the molten salt-containing electrode is Mn—MnO—MnCl.

13. The molten salt-containing electrode of claim 1, wherein the molten salt containing electrode is Fe—$Fe_2O_3$—Fe halide.

14. The molten salt-containing electrode of claim 1, wherein the molten salt-containing electrode is αFe—$Fe_2O_3$—$FeCl_2$.

15. The molten salt-containing electrode of claim 1, comprising an electrolyte and an outer air electrode.

16. A molten salt-containing electrode for a rechargeable oxide-ion battery cell, comprising:
   a molten salt-containing electrode consisting essentially of as formulation: $\alpha Me$-$\beta MeO_x$-$\epsilon MeY$,
   wherein Me is a metal soluable in molten salt,
   wherein MeO is a metal oxide soluable in molten salt,
   wherein MeY is a metal compound, and
   wherein α+β+ε are volume fractions that sum to 1 with α, β and ε each being between 0 and 1.

17. The molten salt-containing electrode of claim 16, wherein Me is selected from the group consisting of Fe, Mn, Ti, Cr, Co, Ni, Cu, Mo, W, Sc, Y, La, Zr, Hf, Ce, Nb, Ta, V, Mo and Pd.

18. The molten salt-containing electrode of claim 16, wherein Y is selected from the group consisting of $Br^-$, $F^-$, $I^-$, $Cl^-$, $(OCH_2CH_3)^-$, $(OCH(CH_3)_2)^-$, $(OCH_3)^-$, $(ClO_4)^-$, $NO_3^-$, $CO_3^{2-}$, $SO_4^{2-}$ and their mixtures.

19. The molten salt-containing electrode of claim 16, wherein Me is selected from the group consisting of Fe, Mn, Ti, Cr, Co, Ni, Cu, Mo and W, and Y is selected from the group consisting of halide (Br, F, I, Cl) and $CO_3^{2-}$ (carbonate).

20. The molten salt-containing electrode of claim 16, wherein the rechargeable oxide-ion battery cell operates below 800° C., the MeY is a molten salt compound, and x is a variable within the range of 1 to 4.

* * * * *